Figure 1:
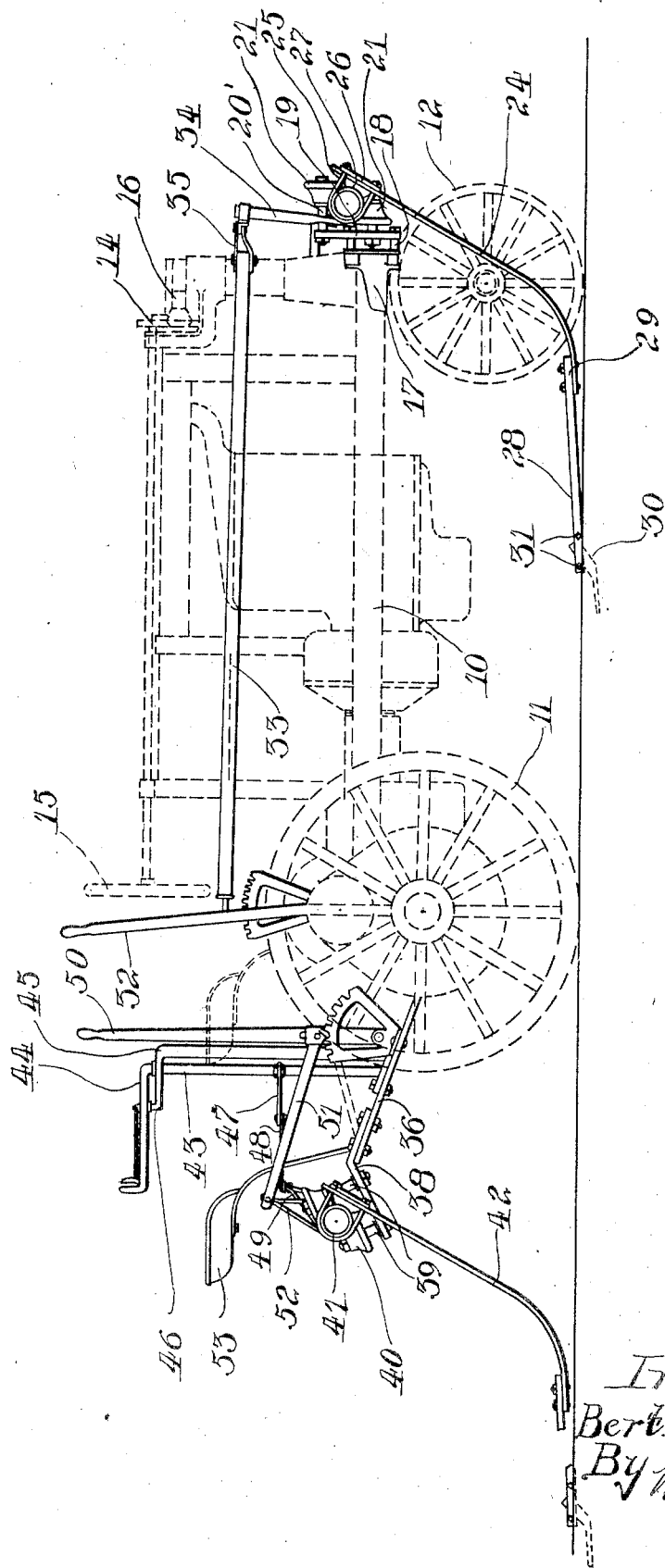

June 25, 1929.  B. R. BENJAMIN  1,718,773
TRACTOR CULTIVATOR
Filed Oct. 25, 1926   2 Sheets-Sheet 1

Inventor.
Bert R. Benjamin
By H. P. Doolittle
Atty.

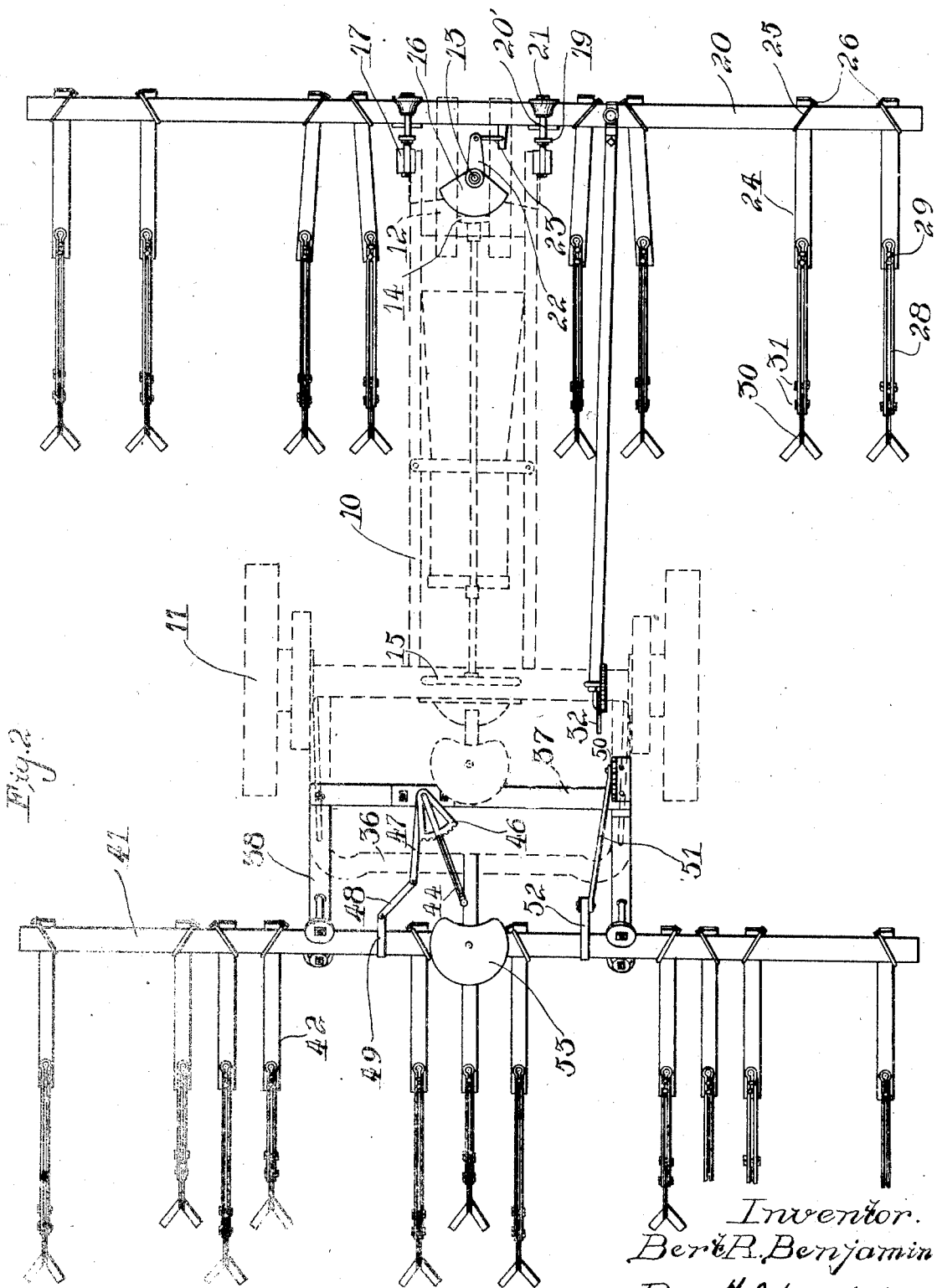

Patented June 25, 1929.

1,718,773

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

TRACTOR CULTIVATOR.

Application filed October 25, 1926. Serial No. 143,845.

The present invention relates to improvements in self propelled farm implements of the soil working class.

The principal object of the invention is to provide a simple and light weight tillage attachment for tractors, and, more particularly, a cultivator attachment of the straddle row type capable of efficiently cultivating four or more plant rows at each traverse of the field.

Another object is to provide simplified mechanism for controlling the operation of a multiple row cultivator during travel.

Still another object is to provide a multiple row cultivator attachment adapted for combination with tractors of existing types and capable of being attached or detached therefrom as desired.

More particularly, the invention resides in providing, on a self propelled vehicle, front and rear frame bars projecting laterally beyond the vehicle body and connected thereto by novel means for permitting both rotary movement and movement in the direction of the longitudinal axis of the bars, said bars being equipped with complemental earth working means of novel form and being controlled by novel means, all as hereinafter more specifically described.

Referring to the drawings:

Fig. 1 is a side elevation of a tractor having the novel earth working means combined therewith, the tractor itself being shown in dotted lines; and Fig. 2 is a similar view in plan.

Included in the general organization constituting one aspect of the invention, there is disclosed in this instance a tractor of a type having a comparatively narrow main frame 10, supported on widely spaced rear traction wheels 11, adapted to span two plant rows, and on a centrally positioned steering truck 12. The truck includes an upright steering standard 13 journaled in a front cross-head on the tractor, and the truck is steered through gears 14 which transmit the rotation of a steering wheel 15 to the standard 13 through a gear sector 16 fixed on the upper end of the standard of the steering truck.

In the practice of the invention the tractor is provided with suitable brackets 17 at each side of the front end of the tractor frame and these brackets receive the securing bolts 18 of bearing brackets 19 which constitute supporting means for an elongated transversely extending frame bar 20 which preferably projects beyond both sides of the tractor body in a manner to span at least four plant rows. Each bracket 19 carries a pair of parallel forwardly extending spindles 20' on which are journaled conical rollers 21. The rollers on the respective spindles are reversed and have concaved bearing surfaces corresponding to the contour of bar 20 which is received between them, as seen on Fig. 1. Bar 20 is thus mounted so as to be axially shiftable in the brackets 19 and in this instance such movement is transmitted to it from the steering standard 13 through a rigid arm 22 and link 23. At spaced points on bar 20, corresponding in this instance to the usual spacing of plant rows, there are secured resilient metal drag beams 24 arranged in pairs and disposed on bar 20 so that each pair will straddle one of the several plant rows spanned by the bar. Each of the resilient drag beams 24 is fixed at its upper end to the bar 20 by suitable clamping means such as a U-bolt 25, connecting plate 26 and clamp-block 27, the upper end of a beam 24 being received and held between a plate 26 and block 27 and all parts locked by drawing up the nuts on the arms of the U-bolt, as clearly seen on Fig. 1. The lower end of each beam 24 is bent to extend rearwardly and preferably has a rigid portion 28 extending in a substantially horizontal plane. The rigid horizontal portion 28 of each beam preferably consists of a flat metal bar folded on itself and set on edge with its folded end secured to the flexible bar at 29. Between the two halves of the bar there is clamped a suitable shovel or sweep 30 by means of suitable bolts 31 passing through the parts of bar 28. The sweep here shown together with its manner of assembly with the bar forms the subject matter of my copending application which has issued as Patent No. 1,685,268 September 25, 1928. Bar 20 may also be rotated in brackets 19 to raise and lower the drag beams and tools through a control lever 32 mounted on the rear axle housing of the tractor and connected by a rod 33 to an arm 34 fixed on bar 20. A flexible link between the rod and arm at 35 permits lateral movement of bar 20. With the construction so far described it will be seen that bar 20 will be shifted laterally in brackets 19 in the direction of steering movement upon actuation of the steering gear through manipulation of steering wheel 15 and that there is differential movement between the bar 20 and steering truck due to the actuating connection through forwardly projecting arm 22 on the steering standard. Quick plant dodging or guiding movement is therefore possible and as the drag beams 24 are rigid as regards lateral movement the tools carried thereby will share the movements of bar 20.

The above described attachment may be used alone as a row crop, or similar, cultivating attachment, but for more efficient and thorough cultivation between plant rows a second, complemental, attachment is employed at the rear of the tractor the construction of which will now be described.

For the purpose of carrying a rear attachment, the tractor is provided with a rearwardly and upwardly extending frame which preferably consists of the U-shaped drawbar 36 normally carried by the tractor and which, in this instance, is fixed thereto in upwardly inclined position. An auxiliary frame comprising a cross bar 37 and rearwardly projecting arms 38 is fixed to U-bar 36 and the free ends of arms 38 form supporting brackets having spindles 39 thereon forming journals for rollers 40 which are constructed and arranged as described in connection with front brackets 19. Between the rollers 40 on arms 38 there is received a cylindrical frame bar 41, similar to but a little longer than bar 20, and this bar carries resilient beams 42 which are structurally identical with the front beams 24 and fixed to the bar 41 as are the front beams. The drag beams on bar 41 are preferably arranged in groups which are so located with respect to the front beams as to engage and cultivate the strip of soil in the space between adjacent pairs of beams on the front bar 20. The rear bar 41 is preferably extended beyond front bar 20 and carries one or more beams on each extended end, as seen on Fig. 2, which engage the soil beyond the outer pairs of beams on the front bar.

The rear bar 41 is also shiftable axially to a limited extent in its bearings on arms 38, but rather for purposes of adjustment of its tools into proper trailing relation with those on bar 20 than for dodging. As means for adjusting this bar there is provided an upright rotatable standard 43 having a crank-arm 44 on its upper end. A suitable supporting bracket 45 for standard 43 is fixed to cross piece 37 and the upper portion of this bracket is formed as a rack sector 46 with which a latch on the crank-arm 44 cooperates. At the proper point on standard 43 there is secured a horizontally projecting arm 47 which is flexibly connected by a link 48 with the bar 41 through a collar 49 in which bar 41 is free to turn. Means for rotating bar 41 to raise and lower its beams is provided in lever 50 mounted on bar 36 and loosely connected by link 51 with a fixed arm 52 on bar 41. A seat 53 may be provided on the rear attachment from which an operator may manipulate the levers 44 and 50, or these may be arranged to be reached from the seat on the tractor. With the beam arrangement on bar 41 above described and shown on Fig. 2, the tools on the front and rear frame bars 20, 41 are corelated and arranged in what may be described as divided sets, straddling each plant row, with the pair of shovels nearest the plant row shiftably connected to the steering gear of the tractor. It will be obvious, however, that the rear attachment may be employed alone and with different tool beam arrangements from that shown if desired.

In operation, the tractor, which straddles two plant rows with its rear wheels, is first driven into position for cultivation. The rear bar 41 is then given any necessary lateral adjustment to bring its beams into proper relation with those on beam 20. The beams are then lowered resiliently pressing the tools into the soil to an extent limited by the rigid beam portions 28 which act as depth gauges. The tractor is then guided along the rows, any turning movement of the steering truck, however slight, being transmitted to bar 20 in amplified degree thus giving easy and quick guiding or dodging action and permitting travel at correspondingly higher speed.

The structure described is light, simple, and so arranged that the working stresses are evenly distributed on the tractor when the full outfit is in use.

The disclosure herein made exemplifies a prepared embodiment of the invention, but other forms thereof are possible within the scope of the appended claims.

What is claimed is:

1. The combination with a vehicle body, of supporting brackets secured thereto, a pair of bearing rollers mounted on each bracket in vertically spaced relation, a transversely extending frame bar received between the bearing rollers and supported thereon for both rotary and axial movements, means on the vehicle for imparting said movements to the bar, and earth working means carried by the bar.

2. The combination with a vehicle body, of supporting brackets secured thereto, a pair of parallel spindles on each bracket spaced in a vertical plane and having concave bearing rollers journaled thereon, a transversely extending cylindrical frame bar engaged between said rollers, earth working means secured thereto, means on the vehicle for shifting the bar axially on the rollers, and means on the vehicle for rotating the bar.

3. The combination with a tractor having dirigible front wheels and means for steering the wheels, of supporting means secured to the front of the tractor, a transverse frame bar having its middle portion slidably and rotatably carried by the supporting means so as to permit both axial and rotating movement of the bar, earth working means secured thereto, means operable by the steering means for moving the bar axially, and means on the tractor for turning the bar on its axis.

4. The combination with a tractor having dirigible front wheels and means for steering the wheels, of supporting means secured to the front of the tractor, bearings on said supporting means, an elongated frame bar received in said bearings for free axial movement of the bar with respect to the supporting means, an actuating connection between the steering means and the bar including means for causing axial movement of the bar by operation of the steering means, and earth working means carried by the bar comprising trailing spring metal beams secured to the bar and arranged in straddle-row relation.

5. The combination with a tractor having dirigible front wheels and means for steering the wheels, of a pair of bars extending across the tractor at the front and rear thereof respectively, the connections with the tractor including means for permitting free independent shifting movement of the bars transversely of the tractor, an actuating connection between the steering means and one of the bars including means for causing shifting movement of the bar by operation of the steering means, means on the tractor for shifting the second bar, and complemental tillage tools carried by the respective bars.

6. A tractor cultivator comprising the combination with the tractor body of a transversely extending bar projecting beyond the tractor, spring metal beams fixed to and depending from said extended portion of the bar and having rearwardly bent ends, rigid horizontally extending dragbars on the ends of said beams, and earth working tools carried by the ends of said dragbars to trail beyond one side of the tractor.

7. An implement carrying attachment for tractors comprising supports adapted to be secured to the frame of a tractor, roller bearings journaled on the supports comprising opposite roller units spaced in a vertical plane, an elongated bar having a portion supported in said bearings for free axial movement of the bar therein, means for controlling said movement of the bar, and earth working means connected to the bar.

8. A tractor cultivator comprising the combination with the tractor of a transversely extending bar mounted across one end of the tractor on supporting means that permit free axial and rotative movements of the bar, spring metal beams fixed to and depending from said bar and having rearwardly bent ends, rigid horizontally extending dragbars on the ends of said beams, earth working tools on the ends of said dragbars, means on the tractor for shifting the transverse bar axially on its supporting means, and means on the tractor for rotatively adjusting said transverse bar on its axis.

In testimony whereof I affix my signature.

BERT R. BENJAMIN.